(12) United States Patent
Pachkov et al.

(10) Patent No.: US 10,999,409 B1
(45) Date of Patent: May 4, 2021

(54) MANAGING MULTIPLE REQUESTS TO REDIRECT LOCAL DEVICES IN REMOTE ACCESS COMPUTING ENVIRONMENTS

(71) Applicant: Parallels International GmbH, Schaffhausen (CH)

(72) Inventors: Sergey Pachkov, Moscow (RU); Igor Marnat, Moscow (RU); Liubov Kulakova, Moscow (RU); Nikolay Dobrovolskiy, Moscow (RU)

(73) Assignee: Parallels International GmbH, Schaffhausen (CH)

( * ) Notice: Subject to any disclaimer, the term of this patent is extended or adjusted under 35 U.S.C. 154(b) by 0 days.

(21) Appl. No.: 16/426,956

(22) Filed: May 30, 2019

(51) Int. Cl.
G06F 15/16 (2006.01)
H04L 29/08 (2006.01)
G06F 9/4401 (2018.01)
H04L 29/06 (2006.01)

(52) U.S. Cl.
CPC ............ H04L 67/34 (2013.01); G06F 9/4411 (2013.01); H04L 67/42 (2013.01)

(58) Field of Classification Search
CPC ......... H04L 67/34; H04L 67/42; G06F 9/4411
See application file for complete search history.

(56) References Cited

U.S. PATENT DOCUMENTS

| | | | | |
|---|---|---|---|---|
| 4,220,990 A * | 9/1980 | Alles | ..................... | G06F 9/4825 710/48 |
| 7,945,908 B1 * | 5/2011 | Waldspurger | ....... | G06F 9/45533 718/1 |
| 2005/0120160 A1 * | 6/2005 | Plouffe | ................. | G06F 9/4856 711/1 |
| 2007/0006205 A1 * | 1/2007 | Kennedy | ................... | G06F 8/63 717/168 |
| 2019/0026144 A1 * | 1/2019 | Bugenhagen | ....... | G06F 13/4072 |

* cited by examiner

Primary Examiner — Suraj M Joshi
Assistant Examiner — Jaren Means
(74) Attorney, Agent, or Firm — Rosenberg, Klein & Lee

(57) ABSTRACT

The subject matter of this specification can be implemented in, among other things, a method that includes establishing connections between a host server and client devices associated with one or more local devices, receiving from the client devices configuration requests to configure, on the host server, drivers for the local devices to convert data between a data format accessible to the local devices and a data format accessible to applications provided to the client devices by the host server, identifying execution priority of the client devices, identifying a first group of configuration requests and a second group of configuration requests, executing, in order of decreased priority of client devices, the first group of configuration requests until an occurrence of a restart condition, and responsive to the occurrence of the restart condition, executing the second group of configuration requests.

20 Claims, 8 Drawing Sheets

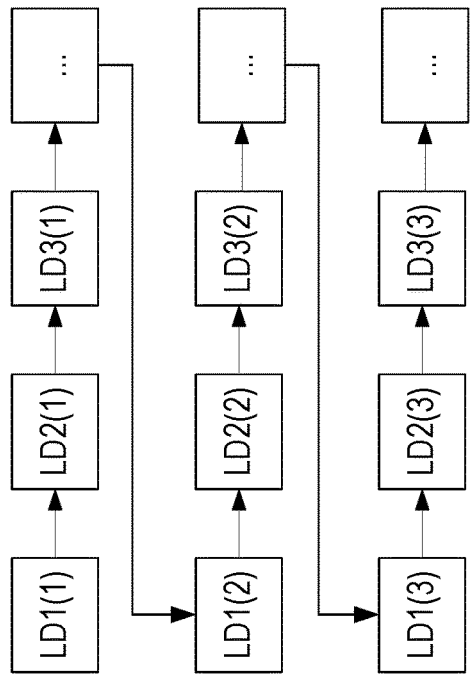
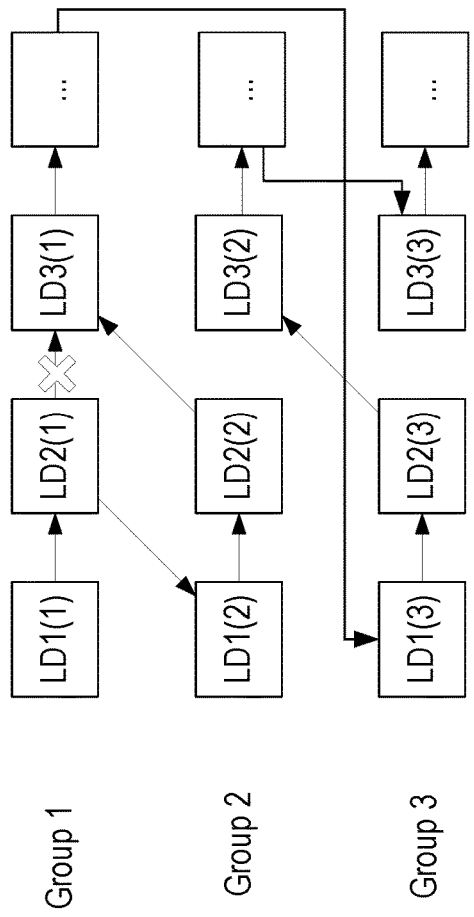
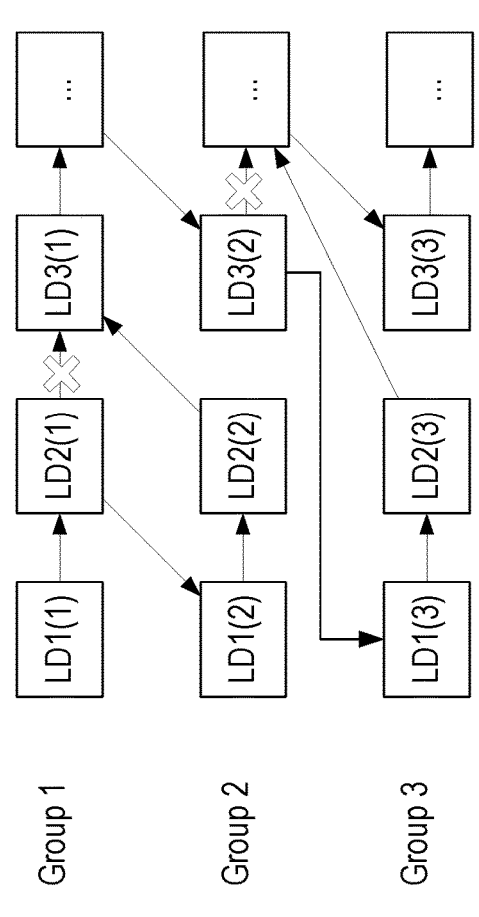
FIG. 7A  FIG. 7B  FIG. 7C  FIG. 7D

MANAGING MULTIPLE REQUESTS TO REDIRECT LOCAL DEVICES IN REMOTE ACCESS COMPUTING ENVIRONMENTS

TECHNICAL FIELD

This instant specification generally relates to running applications from a client device using remote access computing environments. More specifically, the instant specification relates to enabling the use of local devices during remote access sessions.

BACKGROUND

In a network environment, it is often advantageous for a user of a computing device to execute applications on a remote server rather than on the local device. Multiple client devices (clients) can have access to the remote server and applications installed on that server. This eliminates the need to install and upkeep separate applications on client devices, decreases administration demands and costs, and promotes uniformity of user experiences and interchangeability of client devices.

BRIEF DESCRIPTION OF THE DRAWINGS

FIG. 7A illustrates schematically the order of execution of configuration requests if the execution of requests from a top priority client device is not unduly delayed and execution of requests of a first group is followed by execution of requests in a second group, in one exemplary implementation.

FIG. 7B illustrates schematically a "staggered" order of execution of configuration requests when execution of the requests from lower-priority devices in the first group is postponed in favor of execution of the requests from higher-priority devices in the second group, in one exemplary implementation.

FIG. 7C illustrates schematically a "catch up" order of execution of configuration requests when execution of the requests from lower-priority devices in the first group is postponed in favor of execution of the requests from higher-priority devices in the second group, in one exemplary implementation.

FIG. 7D illustrates schematically a possible order of processing of configuration requests when multiple restart conditions occur during execution of the requests, in one exemplary implementation.

DETAILED DESCRIPTION

Figure 1:
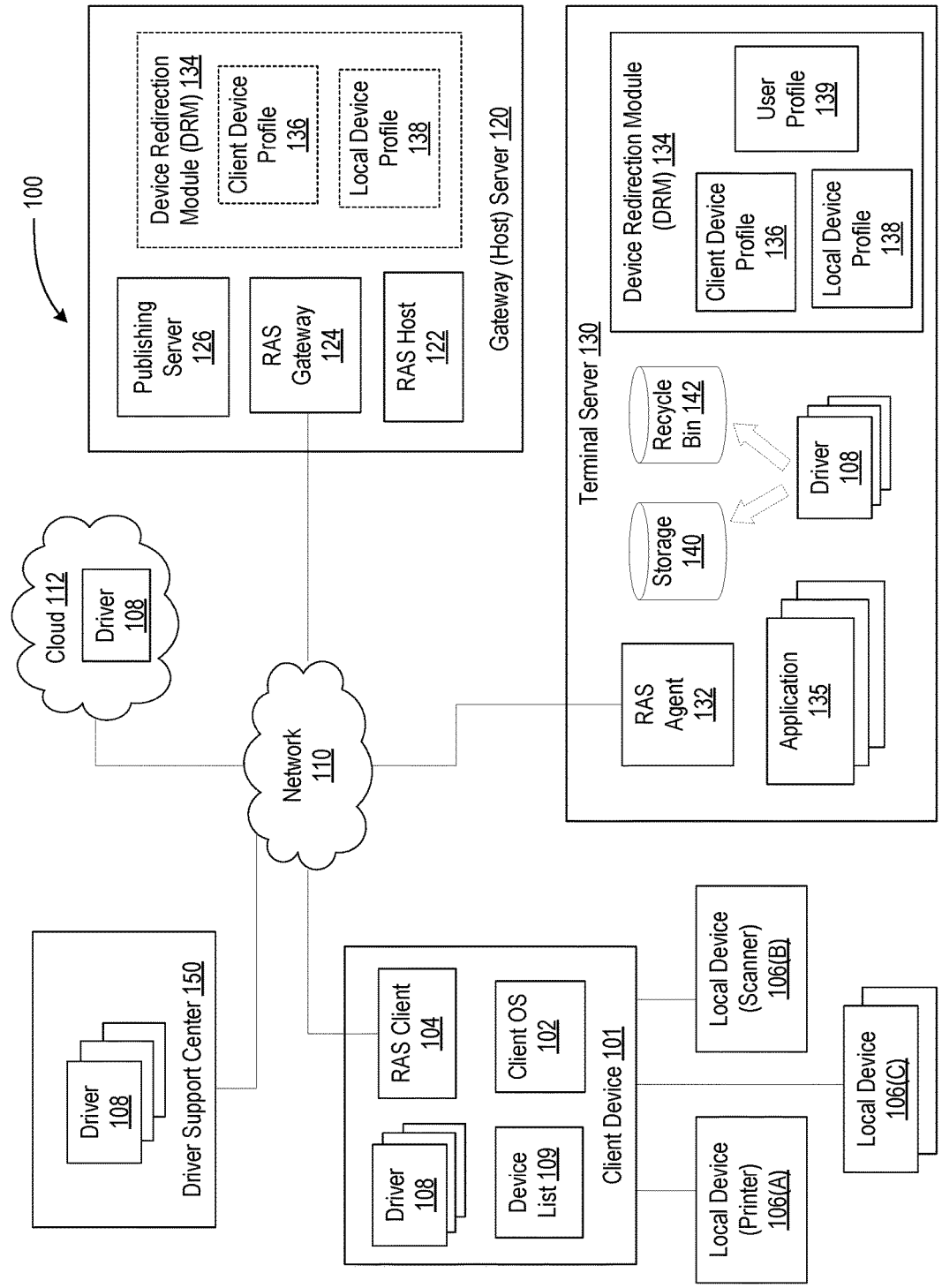
FIG. 1 illustrates schematically a high-level block diagram of an exemplary remote access network environment 100 performing redirection of local devices associated with a client device to a server that provides one or more applications to the client device, in accordance with some implementations.

In a network environment, it is often advantageous for a user of a client device to execute applications on a remote server rather than on the client device. Such server-based computing allows utilizing remote server's computing power and memory capabilities, which often significantly exceed resources available on client devices. Often, a client device is a "lean" (or "thin") machine, which itself performs little computing, or storage of data, with only keyboard, mouse, and graphical interface data being exchanged between the lean client and the remote server device with the bulk of computing, data processing, and data storage taking place on the remote server. The applications executed on the remote server are being delivered to the client device via, for example, a remote desktop session, where the local client device communicates with the remote server using a remote display protocol.

In a remote access environment, a host server (e.g., a gateway server) offering remote access functionality may provide a network connection to the client device and receive a request from the client device to execute an application. The host server may utilize terminal servers to execute requested applications. A terminal server refers to a component (e.g., a software component of a host server or a separate device connected to the host server via a network) that is able to execute a selected application (residing locally on the host server or remotely) in response to the host server's instruction identifying the application. The host server may instruct one of the terminal servers connected to the network to execute the application and facilitate an association of the client device with the terminal server. The terminal server may enable the user of the client device to use the resources of the terminal server to execute the application as if the application were local to the client device.

While some of computing functionality provided to a user of a client device, such as computation and processing of data, may be delegated to such remote access terminal servers, various tasks may need to rely, at least partially, on one or more functionalities that may be provided by a variety of local devices connected the client device. Such local devices may deliver physical functions that cannot be replaced with purely digital processing—printers, scanners, photographic and video equipment, phones, radio transmitters and receivers, manufacturing equipment, and so on. Accordingly, the remote access server may need to communicate data between the application(s) executed thereon on behalf of the client device and one or more local devices associated with the client device. To convert data between a data format accessible to the application and a data format accessible to the local device, a driver for the local device may have to be installed on the terminal server. As a result, the local device may be redirected—i.e., made available—to the terminal server and the applications running therein on behalf of the client device. For example, the data generated by a local scanner may be redirected to the terminal server. Conversely, the data output by the application(s) running on the terminal server may be redirected to the local client device. For example, a print job generated by the application may be converted into a format accessible to a local printer and redirected to the local printer for printing.

As numerous client devices (each one possibly associated with multiple local devices) connect to—and later disconnect from—the terminal server, retaining all installed drivers may clog unnecessarily the memory of the terminal server. On the other hand, removing installed drivers and later reinstalling them are likely to waste valuable processing time if the same client devices repeatedly access the terminal server. Installation of each driver may take substantial time (from tenth of a second to several seconds or even more, depending on the system performance). Also, data transferred during installation of drivers for each local device that may need to be redirected may have a substantial volume, e.g., ranging from tens to hundreds of kilobytes, or more. Additionally, uninstallation requires additional processing and system resources, which may be significant if multiple client devices are disconnecting from the terminal server at the same time. Moreover, as it often happens, some users may connect to the server for short durations and disconnect/reconnect frequently over a short period of time (e.g., a workday).

The implementations disclosed herein provide for optimized management of drivers for local devices in a remote access network environment based on historical data of connections and disconnections between the local devices and one or more servers of the remote access environment. For example, if a local device is unlikely to reconnect for a substantial period of time, such as from the end of a workday on Friday and until the start of the workday on Monday, as indicated by the historical data, a host server or a terminal server of the remote access environment may uninstall the drivers for the local devices associated with the client device. Conversely, if the historical data indicates that the local device is likely to reconnect on Monday within the 8-8:30 am time period, the host server or the terminal server may install the drivers for the local devices prior to the commencement of this time period. In other implementations, the drivers may be installed on the servers prior to an expected increase (e.g., daily) in demand for the servers' processing capabilities.

The present disclosure also describes methods and systems for management of concurrent requests from multiple client devices (connecting to the same remote access environment) to install, remove, or update one or more drivers of the local devices associated with the client devices. In some situations, completing all requests from one client device before beginning processing requests from other client devices may unduly delay delivery of the local device functionality to the user(s) of the other client devices. For example, a client device that connected first to the terminal server may have few, if any, high priority local devices which need to be installed promptly. In contrast, a second client device that connected to the terminal server after the first client device may have several high priority associated local devices that may need to be connected as soon as possible. A server (e.g., a terminal server or a gateway server) that executes requests in the chronological order of client device connections may thus execute low priority requests from the first client device first and delay execution of high priority requests from the second client device. To address this problem, the terminal or gateway server—may process the requests from multiple client devices in such an order that at least some of the requests from the second, third, etc., client devices are processed before at least some of the requests from the first client device. For example, the server may first execute a first group of requests including a first request from the first client device, a first request from the second client device, a first request from the third client device, and so on. When all requests of the first group are executed, the server may begin execution of a second group of requests, which may similarly include requests from multiple client devices. However, in some implementations, if execution of the first group of requests takes too long, the server may stop execution of the first group of requests and begin execution of the second group of requests.

FIG. 1 illustrates schematically a high-level block diagram of an exemplary remote access network environment 100 performing redirection of local devices associated with a client device to a server that provides one or more applications to the client device, in accordance with some implementations. The remote access environment 100 may be a remote desktop service (RDS) environment. In some implementations, the remote access environment 100 may provide virtual machines to client devices. Computer systems, appliances, network segments, and other software or hardware components are shown in FIG. 1 for illustrative purposes only, and the scope of the present disclosure is not limited to the architecture shown in FIG. 1. Routers, firewalls, load balancers, network switches, and/or various other software or hardware components may be omitted from FIG. 1 for clarity and conciseness. Various other computer systems, software or hardware components, and/or methods of their interconnection—which are not shown in FIG. 1—may be compatible with the methods and systems described herein. The systems and methods described herein may be implemented in hardware (e.g., general purpose and/or specialized processing devices, and/or other devices and associated circuitry), software (e.g., instructions executable by a processing device), firmware, or a combination thereof. Various aspects of the disclosure are described in details below by way of examples, rather than by way of limitation.

As schematically illustrated by FIG. 1, the client-host computing environment may comprise one or more client devices 101, which may communicate over a network 110 with a gateway (host) server 120 and one or more terminal servers 130. The network 110 can be Internet, LAN, or a telecommunications network. The network can have access to a cloud storage 112. The cloud storage 112 may be located off-premises and use third-party cloud storage services or similar platforms. Alternatively, the cloud storage 112 can be located on-premises. The cloud storage can be a part of the gateway server 120, one of the terminal servers 130, or one of the client devices 101. In the description below, the singular terms, such as "client device," "host," "server," "environment," etc. will be understood to also correspond to plural terms, whenever more than one device or component can possibly be used. The terminal server 130 may include one or more central processing units (CPU)—not explicitly shown on FIG. 1—also referred to as "processing devices," communicatively coupled to one or more memory devices, and one or more peripheral devices via buses (as shown in more detail in FIG. 8). "Processing device" refers to a device capable of executing instructions encoding arithmetic, logical, or I/O operations. In one illustrative example, a processing device may follow Von Neumann architectural model and may include an arithmetic logic unit (ALU), a control unit, and a plurality of registers. In a further aspect, a processing device may be a single core processor which is typically capable of executing one instruction at a time (or process a single pipeline of instructions), or a multi-core processor which may simultaneously execute multiple instructions. In another aspect, a processing device may be implemented as a single integrated circuit, two or more integrated circuits, or may be a component of a multi-chip module. "Memory device" herein refers to a volatile or non-volatile memory, such as random-access memory (RAM), read-only memory (ROM), electrically erasable programmable read-only memory (EEPROM), or any other device capable of storing data. Examples of peripheral devices include storage devices (such as flash memory cards, flash memory sticks, compact disks, hard disk drives (HDDs) or solid state drives (SSDs)), input/output (I/O) devices (such as network interface controllers (NICs)) and various other devices, such as flash memory cards, compact disks, HDDs, or SSDs.

The terminal server 130 may, alone or in conjunction with the gateway (host) server 120, implement the remote access environment. The remote access environment may be a virtual execution environment, for example but not limited to, an RDS, a virtual desktop infrastructure, a containerization engine, or a virtual execution environment provided by an HTML5-enabled browser. The remote access environment may provide client authentication, load balancing, and/or other features related to brokering the client connections to the virtual execution environments. In one illustrative example, the remote access environment may be enabled by the Parallels® RAS. The gateway server 120 may include a remote application server component (RAS host) 122. The RAS host 122 may be connected to the network 110 via a secure RAS gateway 124. The RAS host 122 may be communicating with an optional client authenticating service (not shown) which facilitates establishing the identity of a user of the client device 101. Upon establishing a connection with the client device 101, the client authenticating service may determine the level of access the particular user/client device combination may have to the RAS host 122. By way of example, a user with the highest access level connecting from a work (e.g., desktop) computer may be allowed the maximum access to the RAS host 122 whereas the same user accessing the host server 120 from a mobile device may be allowed a more limited access to the RAS host 122.

Once the client authenticating service determines the access level, the RAS host 122 may provide the list of resources available to the client device 101 via a publishing server 126 and transmit this list to the client device 101 via the network 110. In some implementations, the publishing server 126 may be located on a computing device different from the gateway server 120. For example, the publishing server 126 may be located on the terminal server 130, or on a designated separate device. A RAS client 104 may be located on the client device 101 and supported by the operating system 102. The RAS client 104 may receive the list of published applications from the remote host and offer it to the user of the client device 101. The list may have graphical representations, such as windows, pop-ups, icons, etc. A console of the RAS host 122 may be used to display a list of published applications on the RAS client 104. The RAS client 104 may allow the user of the client device 101 to launch one or more applications on the remote host as if the application(s) were executed on the client device 101. The RAS client 104 may transmit the list of client-selected applications to be executed on a remote access environment to the RAS host 122 of the gateway (host) server 120 over the network 110 and through the RAS gateway 124. The term "client-selected" should be understood in the broadest sense as including those applications that a human operator chooses to launch as well as applications that are executed automatically by the client device 101, such as applications auto-run during boot, or in response to actions taken by the user (such as starting a mail client or another application), or triggered by extrinsic events (such as starting a teleconferencing application at a pre-arranged time).

In some embodiments, RAS client 104 may be an HTML5-enabled browser. In such embodiments, the remote access environment 100 may be configured to display published remote applications in one or more HTML pages which may be accessed by HTML5-enabled browsers running on the client devices. Thus, from the users' perspective, the published remote applications may be perceived as web-based applications. A menu associated with each entry of the list may include a plurality of actions accessible to the user with respect to the published application, such as the client gateway identifier, the published application identifier, and the height and width of the frame to be displayed by the client device for rendering the application output. A JavaScript code may be utilized for receiving and displaying the data by the client browser.

Responsive to the user's selection from the list of applications provided to the RAS client 104 by the RAS host 122, the gateway server 120 may launch the application (henceforth, the singular word "application" should be understood to mean the entire plurality of applications selected by the user, if applicable) on the terminal server 130 using one or more CPUs and/or memory devices of the terminal server.

In some implementations, once the gateway server 120 has selected a terminal server for execution of the application requested by the client device 101, the RAS host 122 may facilitate a remote access session between the client device 101 and the selected terminal device. For example, if the terminal server 130 is selected, the client device 101 may access, via the network 110, the terminal server 130 through its RAS agent 132. The RAS agent 132 may receive instructions from the RAS host 122 to execute one or more applications 135 selected by the user of the client device 101. In some implementations, the gateway server 120 may determine that some of the applications 135 requested by the user are to be executed on the terminal server 130 whereas some applications may be executed on a different terminal server. In some implementations, the user of the client device 101 may be given an option to choose a specific terminal server. For example, the publishing server 126 may provide the user with both the list of applications supported by the remote access environment 100 and the list of terminal servers accessible to the user. In some implementations, the gateway server 120 may determine that the terminal server 130 has an open remote session (e.g., a remote desktop session) with the client device 101 and may, consequently, redirect the client device 101 to the terminal device 130 to resume that connection.

In some implementations, the files opened in relation to the applications 135 may be stored on the cloud storage 112 and made accessible to both the terminal server 130 (and the second terminal server, if applicable) via the network 110. In some implementations, the application files may be stored on a shared network drive. In some implementations, the files are stored on a user profile disk (UPD) dedicated to the user's profile.

When the client device 101 is directed to the terminal server 130 for execution of one or more applications 135, the RAS client 104 of the client device 101 may communicate identifiers (IDs) of the local devices 106 associated with the client device 101 to the RAS agent 132 (directly, or via the RAS host 122) of the terminal server 130. For example, the client device 101 may maintain a device list 109, which may contain IDs of all or some local devices associated with the client device 101. The client device 101 may update the device list when a new local device is added to the client device or when a driver of the existing client device is updated. The device list 109 may further include a client device ID as well as IDs of the local devices. The client device ID may by a media access control (MAC) address of the client device or any other digital identifier of the client device. The ID of the local devices may be a port number, a PCI bus ID, a simple enumeration of the local device (e.g., local device #1, #2, etc.) or any more elaborate identification (e.g., using a MAC address of the local device, in one implementation), or any other information that identifies a local device. The combination "client device ID+local device ID" may serve as a "RedirectID" for a specific local device associated with a specific client device, which may be used for identification of redirection requests by the gateway/terminal servers of the remote access environment.

The local devices 106 may be printers 106(A), scanners 106(B) or any other local devices 106(C) associated with the client device 101, such as any photographic or video equipment, a phone, a display monitor, a radio equipment, any manufacturing equipment, any controller, any analog or integrated analog-digital device, any physical or chemical measurement device, and so on. The local device 106 may be a part of the Internet-of-Things network. Any number of local devices 106 may be associated with the client device 101. Association may mean any type of direct connection of the local device 106 with the client device 101, such as via a parallel, a serial, a USB port, a PCI (peripheral component interconnect) bus, or any type of input/output connection. Association may also mean any type of a network connection, such as a local Ethernet connection, wireless area network, personal area network, or the network 110. The local devices 106 may be physically located in the vicinity of the client device 101 (e.g, in the same room, in the same building) or may be located far from the client device 101. For example, the client device 101 may be a smartphone carried by an employee whereas the local device 106 may be a printer located at or near the employee's office and capable of executing printing jobs requested from the smartphone. As another example, the local device 106 may be a heating/AC home controller communicating with the smartphone of the home owner over a network. The client device 101 may have one or more drivers 108 installed to exchange data with one or more of its local devices 106.

The RAS client 104 may provide the identifiers of the local devices 106 to the terminal server 130 automatically, responsive to establishing the connection between the client device 101 and the terminal server 130, in some implementations. In other implementations, the terminal server 130 may request identifiers of the available local devices 106 on its own initiative without waiting for a redirection request from the RAS client 104. In some implementations, the user of the client device 101 may request redirection of the local devices 106. The user may be able to select what specific local devices are to be redirected to the terminal server 130 (e.g., from a menu provided). In some implementations, the redirection request(s) may be communicated to the terminal server 130 after a network connection with the client device 101 is established. In other implementations, the redirection request(s) may be communicated to the terminal server 130 after an application is launched on the terminal server 130 and provided to the client device 101. In some implementations, launching a particular application triggers a request to redirect a particular local device 106. For example, launching a word processing software may trigger a request to redirect the local printer 106(A), whereas launching a scanning software may trigger a request to redirect the local scanner 106(B). The redirection request(s) may be provided by the client device 101 uploading the device list 109 (or any part of the device list) to the gateway server 120 or the terminal server 130.

In some implementations, the RAS client 104 provides the list of available local devices to the gateway server 120 before the gateway server 120 decides which terminal server should be hosting the remote desktop session with the client device 101. In some implementations, the decision which terminal server is to be used may be based, at least in part, on the received device list 109 of the local devices 106. For example, if the device list includes a chemical sensing device, the gateway server 120 may select a terminal server that has a proper application installed, capable of processing data communicated by such chemical sensing device.

The terminal server 130 may have a device redirection module (DRM) 134, which may be a software module, in one implementation. The DRM 134 may receive (e.g., from the RAS agent 132) a list of the local devices 106 and may determine if the terminal server 130 has correct drivers installed to enable communication of data between applications 155 and at least some of the local devices 106. A driver for a local device 106 may be any (e.g., software-implemented) component capable of converting data between a data format accessible to the application(s) 155 and a data format accessible to the local device 106. If one or more drivers 108 for the local devices 106 on the list of local devices is already installed on the terminal server 130, the DRM 134 may integrate the driver 108 into the remote access session. For example, if the local device is the local printer 106(A), the DRM 134 may add this printer to the list of printers available to the user of the client device 101, so that the user may use the printer in the same way the user would normally use a local printer that is directly connected to the client device 101. For example, the user may create a document file and select "Print to" the printer 106(A) to send the document thereto. The driver 108 of the printer 106 may then convert the document from a format accessible to the word processing software into the format accessible to the printer 106(A). A spooler function on the terminal server 130 may process the job request, generate a print job, and deliver the data in the printer-accessible format to the local printer 106(A) over the network 110, in one implementation.

In some instances, however, the DRM 134 may determine that at least some of the local devices 106 on the device list 109 of local devices may not have the appropriate drivers installed on the terminal server 130. The DRM 134 may then obtain the necessary driver(s) 108 over the network 110, in one implementation. For example, the DRM 134 may request the driver(s) 108 from the client device 101. Alternatively, the DRM 134 may retrieve the identifiers of the local device 106 from the device list 109 of the local devices. Such identifiers may include the type, manufacturer, model, etc., of the local device 106. Using the identifiers of the local devices, the DRM may download an appropriate driver form a driver support center 150 (for example, the support center of the manufacturer of the local device) over the network 110. In other implementations, the driver 108 may be located on the cloud storage 112. In some implementations, even if the driver 108 is present on the terminal server 130, the DRM 134 may nonetheless verify whether a later version of the driver is available on the client device 101, the driver support center 150, and/or the cloud storage 112, and download an updated driver (or an updated version of the same driver) therefrom. After the driver 108 has been downloaded into the terminal server 130, the DRM 134 may install (or direct the operating system, e.g. a hypervisor, of the terminal server 130) to install the downloaded driver on the terminal server 130. After the driver 108 has been installed, the terminal server 130 may make it available to the applications 135 executed by the user of the client device.

At the completion of the remote access session between the client device 101 and the terminal server 130, the driver(s) 108 of the local device(s) may be stored on the terminal server 130, e.g., in a storage 140, as schematically shown by the left dotted arrow in FIG. 1. In some implementations, the storage 140 may be the same memory location of the terminal server into which the driver(s) has been placed during the installation procedure. In other implementations, the driver(s) may be uninstalled and removed from the terminal server 130 (as schematically shown by the right dotted arrow in FIG. 1 pointing towards the recycle bin 142). In some implementations, the driver(s) 108 may be uninstalled from the terminal server 130, but the file downloaded from the client device 101 or the driver support center 150 may be retained on the terminal device 130 in the storage 140. The DRM 134 may make a decision to retain, discard, or uninstall the driver(s) 108 based on an analysis of historical data of connections between the client device 101 and the terminal server 130 (and/or gateway server 120), as is explained in more detail below.

Independent of whether the driver(s) 108 is retained or removed, the DRM 134 may store identifiers of the client device 101 and the associated with this client device local devices 106. For example, the DRM 134 may store a client device profile 136 listing the types, manufacturers, models, etc., of the local devices that were associated with the client device 101 during the last (and, earlier, if applicable) remote access session. In some implementations, the client device profile 136 may include historical data of connections between the client device 101 and the terminal device 130. In particular, the client device profile 136 may include login statistics (login times and duration of the remote sessions) of such connections.

The DRM 134 may also store, on the terminal device 130, a local device profile 138 for each or some of the local devices 106. The local device profile 138 may include the location of the driver 108 for the local device 106, which may be a file name in a local file system, the location inside the local storage 140, a web-address of the driver 108 in the driver support center 150, a location inside the cloud storage 112 where the driver 108 is stored, and the like. The local device profile 138 may further include historical data pertinent to the local device 106, such as the data specifying those past connections of the client device 101 when the latter actually requested that the local device 106 be redirected to the terminal server 130. The local device profile may include a RedirectID for the local device 106. A separate local device profile 138 may be kept on the terminal server 130 for each local device 106 that has previously been redirected to the terminal server 130. Likewise, a separate client device profile 136 may similarly be kept for each client device 101 that have previously connected to the terminal server 130.

The DRM 134 may also include one or more user profiles 139 to keep track of different users who may be using the client device 101. For example, different employees may use the same client device 101. The user profiles 139 may include statistics keeping track of how often and what local devices 106 different users use, at what time of day and week different users login, and so on. This user statistics may be used by the DRM 134 to retain or pre-install (e.g., before the users are expected to login, as explained below in relation to FIG. 4) the drivers 108 of the local devices 106.

In some implementations, the DRM 134, the client device profile(s) 136, the local device profile(s) 138, and the user profile(s) may be stored, or duplicated, on the gateway server 120, as shown schematically by the corresponding dashed boxes. The gateway server 120 may store such profiles on behalf of one or more terminal servers that belong to the same network of servers providing the remote access connectivity to client devices. In some implementations, the gateway server 120 may base its determination to which terminal server to direct the client device 101 on the client device profile 136, the local device profile 138, and the user profile 139 containing historical data of connections of the client device 101. The DRM 134 may also be located on the gateway server 120 and may provide coordination between various terminal servers of the network. For example, the gateway server 120 may decide to connect the client device 101 to the terminal server 130 based on the data stored on the gateway server 120 that indicates that the terminal server 130 has one or more drivers for the local devices associated with the client device 101 already installed on the terminal server 130. In some implementations, the gateway server 120 may facilitate delivery of the driver 108 of the client device to the terminal server 130 from another terminal server of the network where the driver 108 has been previously installed.

Figure 2:
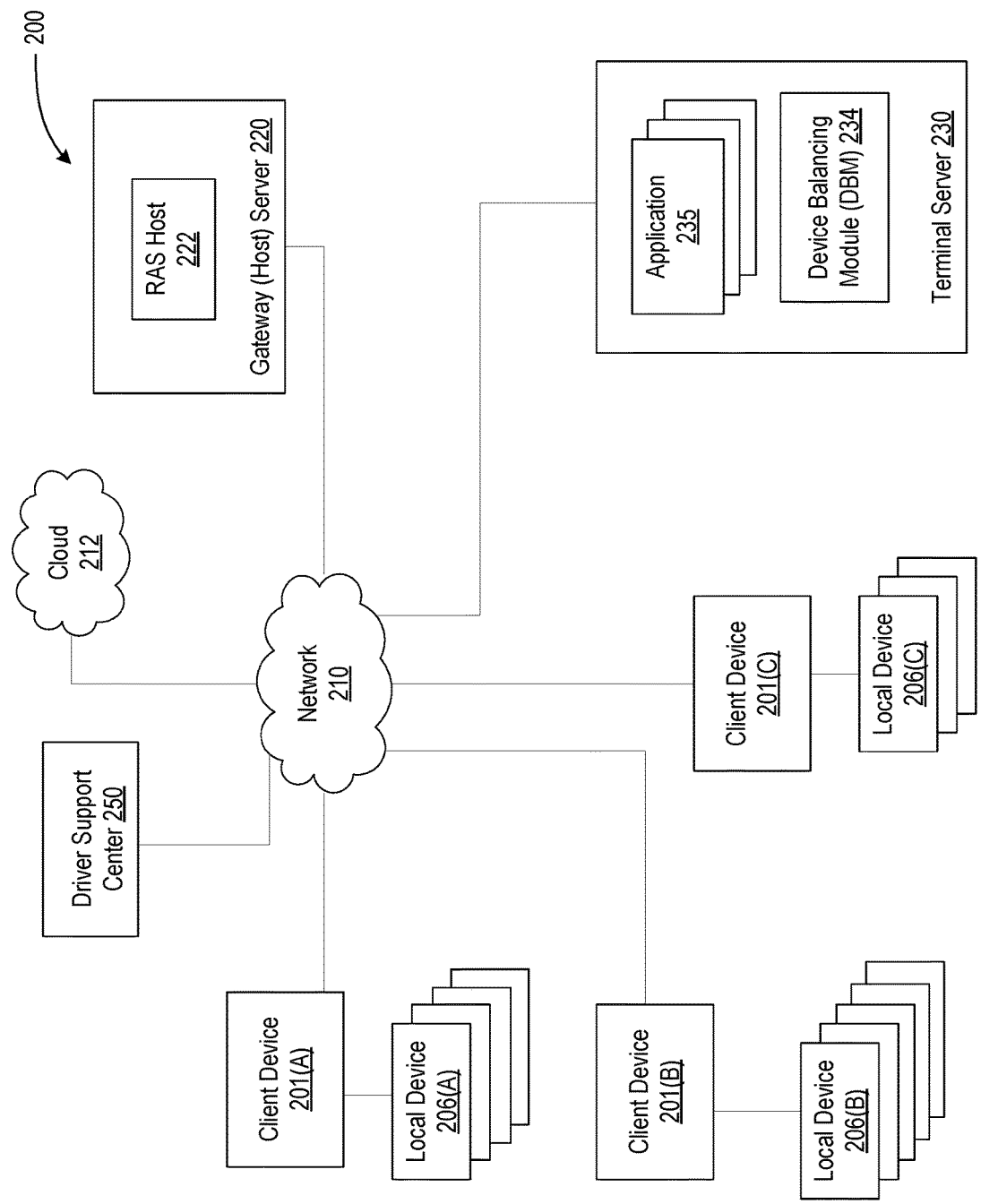
FIG. 2 illustrates schematically a high-level block diagram of an exemplary remote access environment performing balancing of multiple requests to redirect local devices associated with a plurality of client devices that are connected to a remote access terminal server, in accordance with some implementations.

FIG. 2 illustrates schematically a high-level block diagram of an exemplary remote access environment 200 performing balancing of multiple requests to redirect local devices 206 associated with a plurality of client devices 201 that are connected to a remote access terminal server, in accordance with some implementations. The remote access environment 200 may be a remote desktop service (RDS). In some implementations, the remote access environment 200 may provide virtual machines to multiple client devices. Computer systems, appliances, network segments, and other software or hardware components are shown in FIG. 2 for illustrative purposes only, and the scope of the present disclosure is not limited to the architecture shown in FIG. 2. Routers, firewalls, load balancers, network switches, and/or various other software or hardware components may be omitted from FIG. 2 for clarity and conciseness. Various other computer systems, software or hardware components, and/or methods of their interconnection—which are not shown in FIG. 2—may be compatible with the methods and systems described herein. The systems and methods described herein may be implemented by hardware (e.g., general purpose and/or specialized processing devices, and/or other devices and associated circuitry), software (e.g., instructions executable by a processing device), firmware, or a combination thereof. Various aspects of the above referenced disclosure are described in details below by way of examples, rather than by way of limitation. The numbering of different components shown in FIG. 2 may correspond to the numbering of similar components in FIG. 1. For example, any two components 1XY and 2XY that differ by the first digit may indicate components that have the same or similar functionality. Any components that are shown in FIG. 1 but are not explicitly depicted in FIG. 2 may also be implemented as part of the remote access environment 200, in accordance with the descriptions of the corresponding components in reference to the remote access environment 100.

The gateway server 220, via its RAS Host 222, may provide client authentication, load balancing, and/or other features related to brokering the client connections to the remote access execution environments on one or more terminal servers 230. A single terminal server (e.g., the terminal server 230) may concurrently provide remote access to a plurality of client devices, such as client devices 201(A), 201(B), 201(C), and so on, in one implementation. At least some of the client devices 201 may be associated with multiple local devices, such as the local devices 206(A), 206(B), 206(C), associated with the client devices identified by the same letter.

Upon successful negotiation of the connection with the terminal server 230, some or each of the client devices 201 may provide the terminal server 230 with one or more requests to redirect one or more local devices 206 to the terminal server 230. In some implementations, the device list 109 of the local devices 206 to be redirected may be received by the gateway server 220 after the authentication of the specific client device and prior to the establishment of the connection between the client device and the terminal server 230. Subsequent to establishing such connection, the gateway server 220 may forward the list of requests (e.g., the list of RedirectIDs) to the terminal server 230 that the gateway server 220 selects to provide the remote access to the client device 201. In some implementations, the gateway server 220 may store a profile of the client device 201 (such as the client device profile 136) comprising the list of local devices associated with the client device 201. The gateway server 220 may forward this list of the local devices to the terminal server 230. In some implementations, the gateway server 120 may forward this list of the local devices to the terminal server 230 without receiving an explicit request from the client device 201. In some implementations, the list of requests received from the client device may only contain requests to add local devices 206 associated with the client device 201. In other implementations, where some of the local devices 206 may have been installed on the terminal server 230 during one of previous connections of the client device 201 to the terminal server 230, the requests provided by the client device 201 may include requests to remove one or more local devices 206 that are no longer associated with the client device 201. For example, a printer or a scanner may have been removed or replaced with a new devices since the last connection. In some implementations, the local device 206 may be reconnecting to a previously open remote access session during which some local devices 206 had been installed but are now disassociated from the client device 201.

Accordingly, the terminal server 230 may receive a number of configuration requests from a plurality of client devices, such that each configuration request may request that a driver for the local device (e.g., identified by its RedirectID) be configured in some way, e.g., installed, removed, or updated. To determine the order of execution of the multiple requests received, the terminal server 230 may establish the priorities of configuration requests and determine the execution order based on this established priorities. In one implementations, the terminal server 230 may have a device balancing module (DBM) 234 to balance handling of multiple requests. The DBM 234 may be implemented together with the DRM 134 as a single component. Alternatively, the DBM 234 and the DRM 134 may be implemented as two separate modules.

The DBM 234 may group configuration requests in such a way that requests from multiple client devices are executed in the first (top) priority group which may include one, two, or more top priority requests from each or some client devices. Following the execution of the requests from the top priority group, the DBM 234 may begin execution of the second priority group which may include one, two, or more lower priority requests from each or some client devices. Grouping of the local devices in the order of their execution priority may be based on the analysis of historical data of connections between the client device 101 and the terminal server 130 and the frequency of use of various local devices 206 during those connections. Further details regarding grouping of configuration requests are explained in more detail below, in relation to FIG. 5.

During execution of the prioritized configuration requests, the DBM 234 may obtain the drivers for the local devices 206 from the associated with them client devices 201. Alternatively, the DBM 234 may retrieve the identifiers of the local device 206 from the configuration request (e.g., the type, manufacturer, model, etc., of the local device), and download the appropriate driver form the driver support center 250 or from the cloud storage 212 over the network 210.

Figure 3:
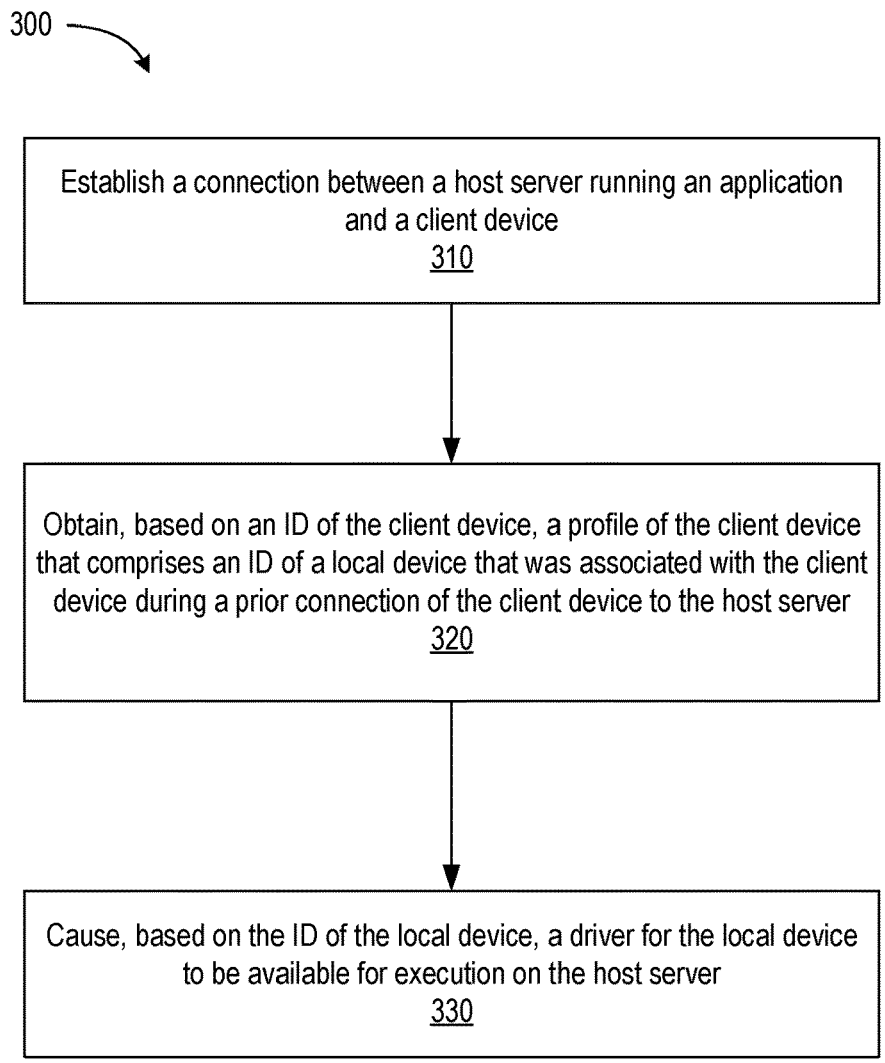
FIG. 3 depicts a flow diagram of one illustrative example of a method of redirection of local devices associated with client devices connected to a remote access terminal server, in accordance with some implementations.

FIG. 3 depicts a flow diagram of one illustrative example of a method 300 of redirection of local devices associated with client devices connected to a remote access terminal server, in accordance with some implementations. Method 300, as well as a related method 400 disclosed below, and/or each of their individual functions, routines, subroutines, or operations may be performed by one or more processing units of a processing device implementing the method, e.g., the gateway server 120, the terminal server 130, or another server of the client-host computing environment. In certain implementations, methods 300 and 400 may be performed by a single processing thread. Alternatively, methods 300 and 400 may be performed by two or more processing threads, each thread executing one or more individual functions, routines, subroutines, or operations of the method. In an illustrative example, the processing threads implementing methods 300 and 400 may be synchronized (e.g., using semaphores, critical sections, and/or other thread synchronization mechanisms). Alternatively, the processing threads implementing methods 300 and 400 may be executed asynchronously with respect to each other. Various steps of the methods 300 and 400 may be performed in a different order compared to the order shown in FIG. 3 and FIG. 4. Some steps of the methods may be performed concurrently with other steps. Some steps may be optional.

The method 300 may begin at block 310 with establishing a connection between a host server and a client device 101. Henceforth, the term "host server" shall be understood as designating either the gateway server 120 or the terminal server 130. In some implementations, the client device 101 may connect to the terminal server 130 directly. In some implementations, the client device 101 may first connect to the gateway server 120 that publishes application to the client device 101 using the publishing server 126. There may be more than one client device 101; the method 300 may be similarly applied to instances where multiple client devices are present or only a single client device is present. In the description of the methods 300 and 400, a singular term "client device" shall also be understood as describing multiple client devices. The host server may be providing one or more applications 135 to the client device 101 via a connection (e.g. over the network 110) between the host server and the corresponding client device. The applications 135 may include a full virtual machine environment, a remote desktop access, a word processing application, a computational application, a graphics application, a video application, a gaming application, or any other application capable of being executed on a computer. The client device 101 may be associated with one or more local devices 106. The association may be over any wired or wireless connections.

Establishing the connection between the client device and the terminal server may include authentication of the client device. This may include Network Level Authentication, in some implementations. When attempting to establish the connection with the remote host and/or the terminal server, the user of the client device may be prompted to enter a password, in some implementations. In some implementation, the client device may be authenticated using a digital certificate, which may be a public key certificate containing a public key, an identifier of the client device, a metadata, a digital signature, and other data.

Following the authentication of the client device, the gateway server 120 may check whether any of the terminal servers of the remote-desktop network environment already has an ongoing session owned by the client device 101. Such a session may have been opened during one of the previous connections between the client device 101 and the remote access network environment 100. The ongoing session may be in an active state, an idle state, a paused stated, and so on. If such session is found—e.g., on the terminal server 130— the gateway server 120 may instruct the terminal server 130 to provide the ongoing session to the client device 101 (rather than open a new session). The terminal server 130 may then and provide any additional applications that may be requested by the client device 101 through the ongoing session. If no opened session owned by the client device 101 is found, the gateway server 120 may instruct the terminal server 130 to instantiate a new session for the client device 101. In deciding which terminal server is to provide a new remote access session to the client device 101, the gateway server 120 may take into account current loads that various terminal servers have. In some implementations, the decision which terminal server is to provide a remote access session to the a client device may be based on which of the terminal servers has the largest number of the drivers installed for various local devices associated with that particular client device.

At block 320, the method 300 may continue with obtaining, based on an ID of the client device 101, a profile of the client device, which may be the client device profile 136 of FIG. 1. In some implementations, the ID of the client device may be the same identifier as used for the client device authentication. In some implementations, the ID of the client device may be additional information not used during authentication. In some implementations, the ID of the client device may by its media access control (MAC) address, or its IP address, or any other digital information (or an analog signal) that uniquely identifies the client device.

The profile of the client device may comprise IDs of local devices 106, such as ReguestIDs, that were associated with the client device 101 during one or more prior connections of the client device 101 to the gateway server 120 or the terminal server 130 (or to any other terminal server of the remote-desktop network environment). The IDs of the local devices may be used to retrieve local device profiles 138 stored on the terminal server 130 (or on the gateway server 120, or elsewhere, e.g., on the cloud 112). There may be as many local device profiles 138 as there have been redirection requests received from the client device 101 during all previous connection with the terminal server 130 or the host server 120, in some implementations. In some implementations, only some of the previously redirected local devices may have profiles stored on the terminal server 130 and/or the terminal server 130. For example, only profiles of the local devices that have been previously redirected at least twice may be stored.

The profiles of the local devices may include a type, make, and model of the local device. The profiles of the local devices may further include identification of the driver for the local device. Such identification may include a type, a provider, a version of the driver, a location (network or local) where the driver is stored, the expected date when the new version of the driver is to be released, and/or any other information identifying the local device and/or the driver for the local device. For example, the profiles for the local devices may include the historical data—e.g., the time logs—keeping track of the previous connections of the client devices in which the client devices requested redirections of their local devices to the terminal server of the remote access network environment. The historical data may include the number of times the local devices have actually been used during previous remote access sessions. More specifically, in case of a printer local device, the historical data may include the number of print jobs redirected from various remote terminal servers to the local printer.

At block 330, the method 300 may continue with causing, based on the identifier of the local devices, the drivers for the local device to be available for execution on the terminal server. Having received the identifiers of the local devices that have already connected to the terminal server or are about to be connected to the terminal server (e.g., are in the process of being connected to the terminal server per instructions from the gateway server), the processing device executing the method 300 may locate information identifying the driver of the local devices. As explained above, such information may be located in the local device profile 138, which may be managed by the DRM 134, and may be stored within a memory allocated to the DRM 134. In some implementations, to cause the drivers for the local devices to be available for execution on the terminal server 130, the processing device may locate the storage locations of the previously installed drivers for the local devices and provide the links with these storage locations to the applications 135 running (or about to be running) on the terminal server 130. In other implementations, to cause the drivers to be available for execution on the terminal server, the processing device may install the drivers for the local devices, e.g., form the driver support center 250, from the cloud storage 112, the gateway server 120, or from any other location where the drivers may be found. Causing the drivers for the local devices to be available for execution on the host server may be accomplished without receiving explicit redirection requests from the client devices (or prior to receiving any such redirections requests). As explained above and disclosed in more detail below with reference to method 400, this may be accomplished by collecting and using historical data of previous connections between the client device and the remote access network environment.

Figure 4:
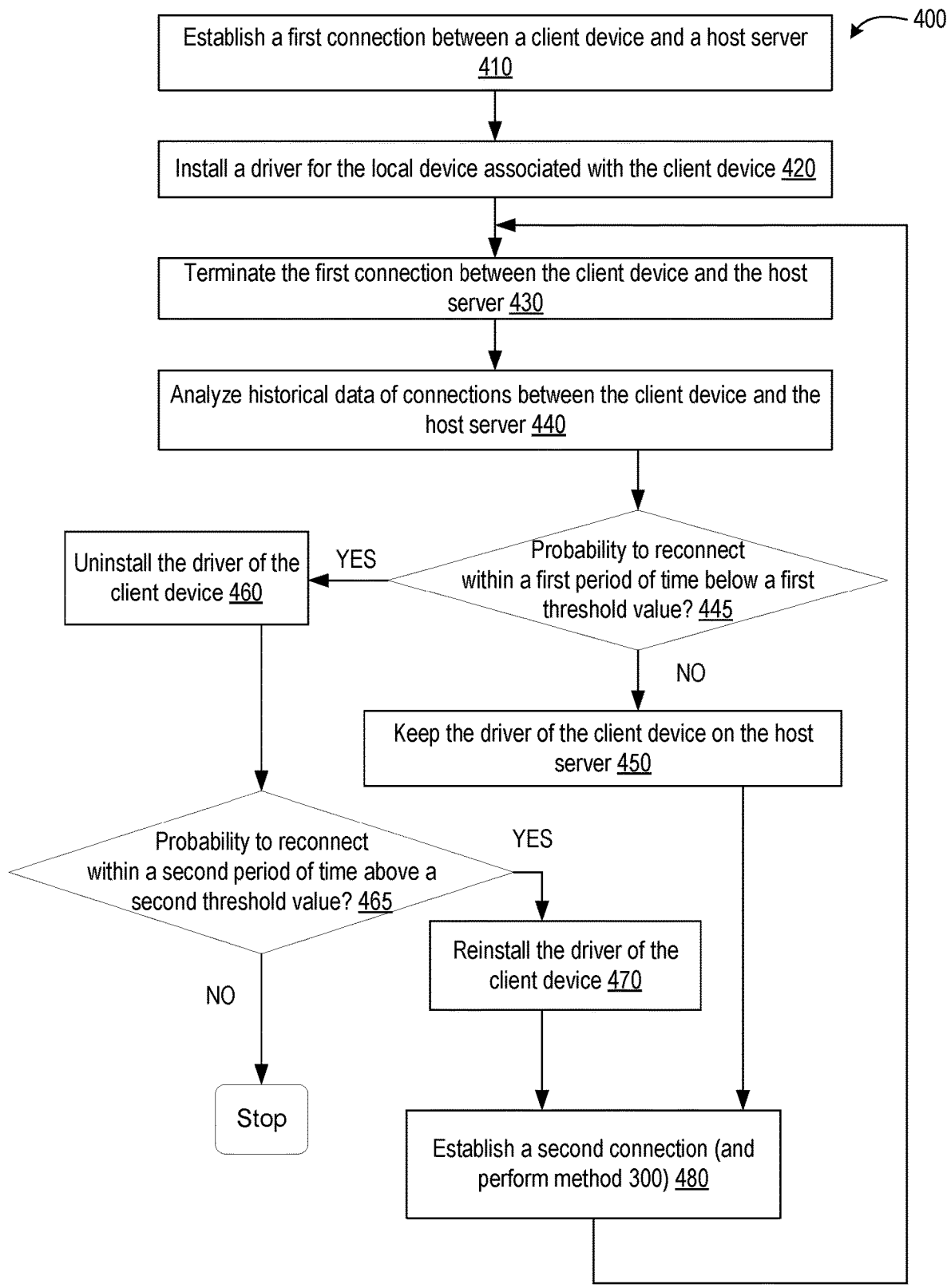
FIG. 4 depicts a flow diagram of one illustrative example of a method of using historical data of client device connections and local device redirection requests for efficient management of subsequent connections between the client device and a remote access network environment, in accordance with some implementations.

FIG. 4 depicts a flow diagram of one illustrative example of a method 400 of using historical data of client device connections and local device redirection requests for efficient management of subsequent connections between the client device and a remote access network environment, in accordance with some implementations. The method 400 may begin with establishing, at block 410, a first connection between a client device and a host (terminal or gateway) server in order to provide remote execution of applications on the host server to the client device. The first connection may be, historically, the very first connection between the client device and the host server. In some implementations, the first connection may not be, historically, the very first connection between the client device and the host server. During the first connection, the client device may be prompted to submit one or more requests to redirect one or more local devices associated with the client device. In some implementations, the local device may submit redirection requests on its own initiative without a prompt from the host server.

At block 420, the method 400 may continue with installing one or more drivers for the one or more local devices associated with the client device. This may be accomplished by downloading the driver from the driver support center 150, from the cloud 112, or by receiving the driver directly from the client device 101. At block 430, the first connection may be terminated. This may occur when the user of the client device has finished running applications on the remote access network and closed the remote access session, in one implementation. In some implementations, the termination may be forced, either due to a loss of the network connectivity, or by an action initiated by the host server. In some implementations, a remote access session may be still ongoing (in an active, idle, paused, etc., state) even after the first connection is terminated. In such instances, for the purposes of description of the method 400, the term "termination of the first connection" shall also include instances where an ongoing session remains after the first connection ceases.

At block 440, the method 400 may continue with the processing device analyzing historical data of connections between the client device and the host server. The historical data may include data about time (e.g., starting time) and duration of the first connection, which may be any connection where the driver for the local device was installed on the terminal (or gateway) server, even though the driver may have been also installed during other (prior or later) connections. The historical data may also include data about time and duration of any prior connections (i.e. those that occurred before the first connection) or later connections (i.e. those that occurred after the first connection). If it is determined, at decision-making block 445, that the probability of the client device requesting, within a specific first period of time, a new connection to the host server is above a first threshold value, the processing device executing method 400 may keep, at block 450, the driver of the client device on the host server.

The first period of time may refer to any period of time during which the likelihood that the client device will establish another connection (or resume an existing session) is to be determined. For example, the first period of time may include the next hour, the next day, the next week, the next month, or any other period of time to commence after the analysis of the historical data is undertaken. In some implementations, the first period of time may refer to a specific time of day or a specific time of week. For example, the first period of time may refer to a period from 8 am to 9:30 am or any other period at or close to the start of a workday or from 12 pm to 2 pm or any other period at or close to the lunchtime. As another example, the first period of time may refer to any specific day of the week, or multiple days of the week, such as Monday through Friday. In some implementations, the first period of time may refer to any period of time after the end of a weekend or after the end of any holidays. In some implementations, the first period of time may refer to a period from 5 pm to 8 am of the next day or any other period after or close to the start of a workday. The first period of time may refer to any specific day of the week, or multiple days of the week, such as a period from Saturday through Sunday. In some implementations, the first period of time may refer to any period of time that is left until the end of a workweek or until any holidays.

Determining the probability of the client device requesting, within the first period of time, a new connection to the host server (e.g. a gateway server 120, a terminal server 130, and/or any other server in the remote access environment 100) may include determining, using historical data, how many times the client device has requested connections to the host server in the past during similar periods of time. For example, if the first period of time is from 5 pm to 8 am of the next workday, it may be determined how many times the client device has requested connections from 5 pm to 8 am of the next workday. The probability of requesting a connection within the first time period may be computed as the ratio of the number of the first periods in the past where a connection was requested to the total number of such periods (for which the historical data is available). If the computed probability is below (or at) a certain pre-determined first threshold value (e.g., 20%, 30%, 40%, or any other value), the method 400 may continue with uninstalling, at block 460, the driver of the local device. This may be done to make the resources of the host server available for other tasks and prevent the host server from storing drivers that will likely be unneeded for the duration of the first period of time.

It may be decided at some later time, at block 465, based on historical data of connections between the client device and the host server, that probability of the client device requesting, within a specific second period of time, a new connection to the host server is above a second threshold value. The second period of time may be prior to the start of a new workday, or a new workweek, or after a holiday period has ended. The term "second period of time" may also include any examples listed above for the first period of time.

The probability that the client device will request a new connection within the second period of time may be computed in a way similar to the computation of the probability that the client device will request a new connection within the first period of time, as described above. For example, the probability may be computed as the ratio of the number of the second periods of time in the past where a reconnection was requested to the total number of the second periods of time (for which historical data is available). To determine this probability, the processing device executing the method 400 may run, at block 465, analysis of historical data that is similar to the analysis performed at block 440. In some implementations, the analysis that the client device is likely to reconnect within a second period of time may be performed at block 440 together with the analysis for the first period of time.

Responsive to determining that the computed probability is above (or at) a certain pre-determined second threshold value (e.g., 20%, 35%, 50%, or any other value), the method 400 may continue, at block 470, with reinstalling the drivers for the one or more local devices that were associated with the client device during one or more previous connections. Reinstallation of the drivers may be performed similarly to how initial installation of the drivers was done at block 420.

Once the drivers are installed on the terminal server 130 (and/or the gateway server 120), the processing device may establish a second connection between the client device and the remote host, at block 480, and may perform the method 300, as described above. Just as the first connection is not necessarily the very first connection historically, the second connection may be any connection that occurs after the first connection (e.g., after an arbitrary number of intervening connections). The second connection may be any connection during which the drivers of the local devices are installed without receiving the configuration requests from the client device.

If, however, it is determined, at decision-making block 445, that the probability of the client device requesting a new connection within the first period of time is above the first threshold value and, consequently, the driver of the client device is kept on the host server at block 450, the method 400 may proceed directly to block 480. Namely, the method 400 may wait for another connection between the client device and the host server to be reestablished. Subsequently, the method 300 may be performed with the drivers for the local devices associated with the client device already pre-installed on the host server.

Figure 5:
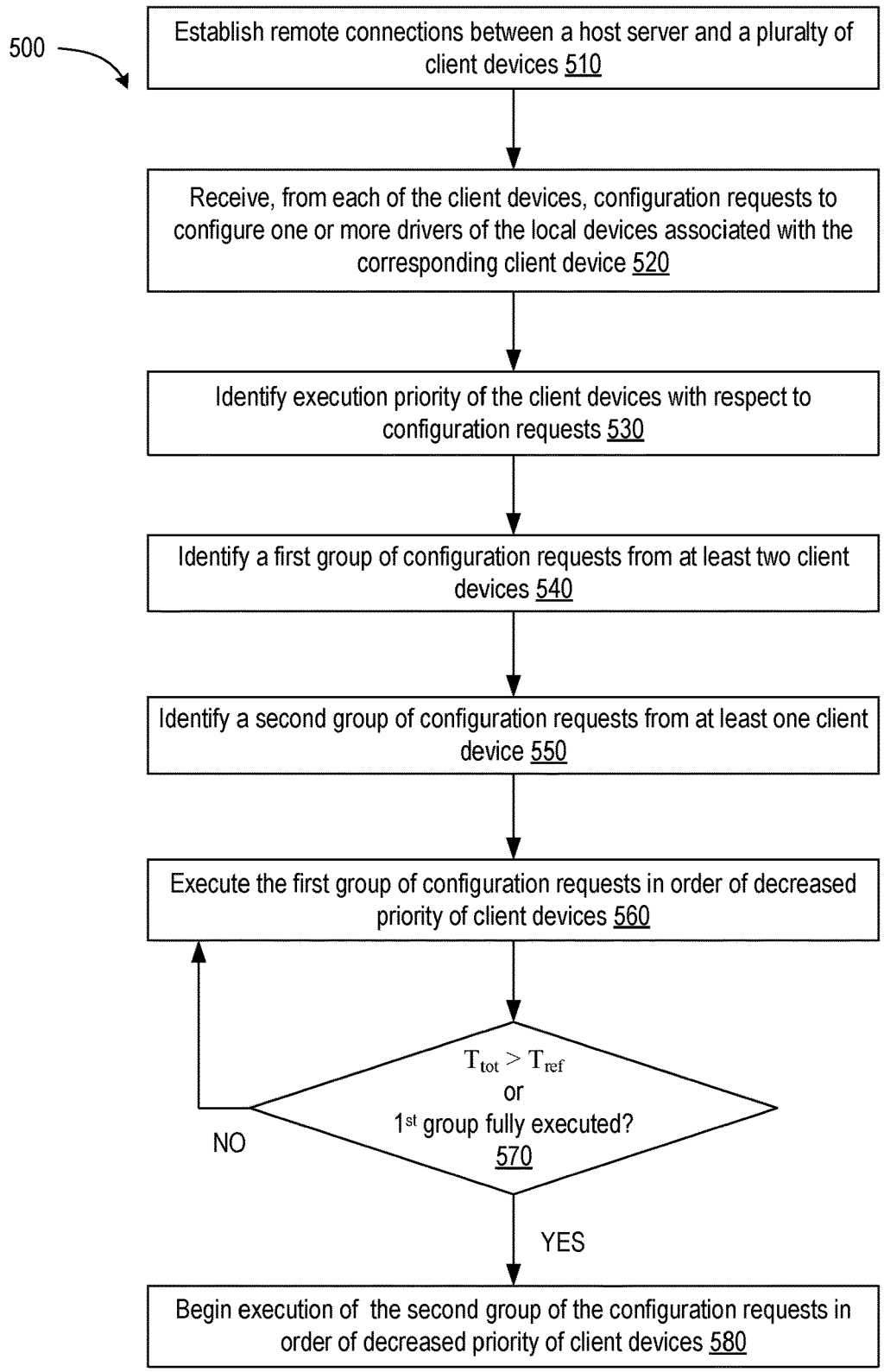
FIG. 5 depicts a flow diagram of one illustrative example of a method of balancing multiple requests to redirect local devices associated with a plurality of client devices connected to a remote access terminal server, in accordance with some implementations.

FIG. 5 depicts a flow diagram of one illustrative example of a method 500 of balancing multiple requests to redirect local devices associated with a plurality of client devices connected to a remote access terminal server, in accordance with some implementations. Method 500 and/or each of its individual functions, routines, subroutines, or operations may be performed by one or more processing units of a processing device implementing the method, e.g., the gateway server 220 (or 120), the terminal server 230 (or 130), or another server of the client-host (remote access) computing environment. In certain implementations, method 500 may be performed by a single processing thread. Alternatively, method 500 may be performed by two or more processing threads, each thread executing one or more individual functions, routines, subroutines, or operations of the method. In an illustrative example, the processing threads implementing method 500 may be synchronized (e.g., using semaphores, critical sections, and/or other thread synchronization mechanisms). Alternatively, the processing threads implementing method 500 may be executed asynchronously with respect to each other. Various steps of the method 500 may be performed in a different order compared to the order shown in FIG. 5. Some steps may be performed concurrently with other steps. Some steps may be optional.

The method 500 may begin at block 510 with establishing connections between a host server (e.g., the gateway server 220 or the terminal server 230) and a plurality of client devices 201. The host server may establish a client device list identifying the plurality of client devices connected to the host server. The host server may be providing one or more applications 235 to the client devices 201 via a connection (e.g. over the network 210) between the host server and the corresponding client device. The applications 235 may include a full virtual machine environment, a remote desktop access, a word processing application, a computational application, a graphics application, a video application, a gaming application, or any other application capable of being executed on a computer. Each of the client devices 201 may be associated with one or more local devices 206. The corresponding associations may be over any wired or wireless connection.

At block 520, the method 500 may continue with receiving, by the host server, a queue of configuration requests from each of the plurality of client devices. The configuration requests may be to configure, on the host server, one or more drivers for the local devices 206 associated with the corresponding client device 201. A queue from a specific client device 201 may include one or any plural number of configuration requests. In some implementations, a client device 201 may set an order of the requests in the queue for that client device. In some implementations, the order in the queue may be random or may be based on (e.g., numerical order) the order of the IDs of the local devices. In some implementation, the host server may determine the order in the queues for various client devices, as describe below.

The configuration requests may be to install a driver of the local device 206 on the terminal server 230 to facilitate the redirected use of the local device 206 by the user of the client device 201 during execution of one or more applications 235 on the terminal server 230. In some implementations, the driver may be already stored (e.g., in the storage 140) on the terminal server 230. In such instances, installation of the driver of the local device may include referencing the location of the driver in the storage 140 and/or installation of the driver from the location in the storage. In some implementations, the configuration requests may include one or more requests to uninstall (terminate) a driver for a particular local device 206 from the terminal server. In some implementations, the configuration requests may include one or more requests to update the drivers for the local devices (e.g., to replace an existing driver with a newer version) on the terminal server. In some implementations, the configuration requests are sent by the client devices 201 to the terminal server directly. In some implementations, the configuration requests are transmitted through the gateway server 220 to the terminal server 230. In some implementations, the configuration requests are issued by the gateway server 220 after the gateway server 220 retrieves the profiles of the client devices 201 (e.g., the client device profiles 136) and/or the profiles of the local devices 206 associated with the client devices 201.

At block 530, the method 500 may identify execution priorities of the client devices with respect to their configuration requests. In some implementations, the priorities are determined by the time when the connection was established between the host server and the client device, such as the time of authentication of the client device on the gateway server 220 or the time of connection between the client device and the terminal server 230. For example, the highest priority may be given to the client device that connected or authenticated at the earliest time, the second highest priority may be given to the client device that connected or authenticated next, and so on. The priorities may determine the order in the queues for configuration requests execution. In some implementations, the gateway server 220 or the terminal server 230 may maintain the listings of priorities of various client devices and assign a priority level (e.g., "1" may be the highest priority, "5" may be the lowest priority) to each of the client devices 206 after their authentication.

Figure 6:
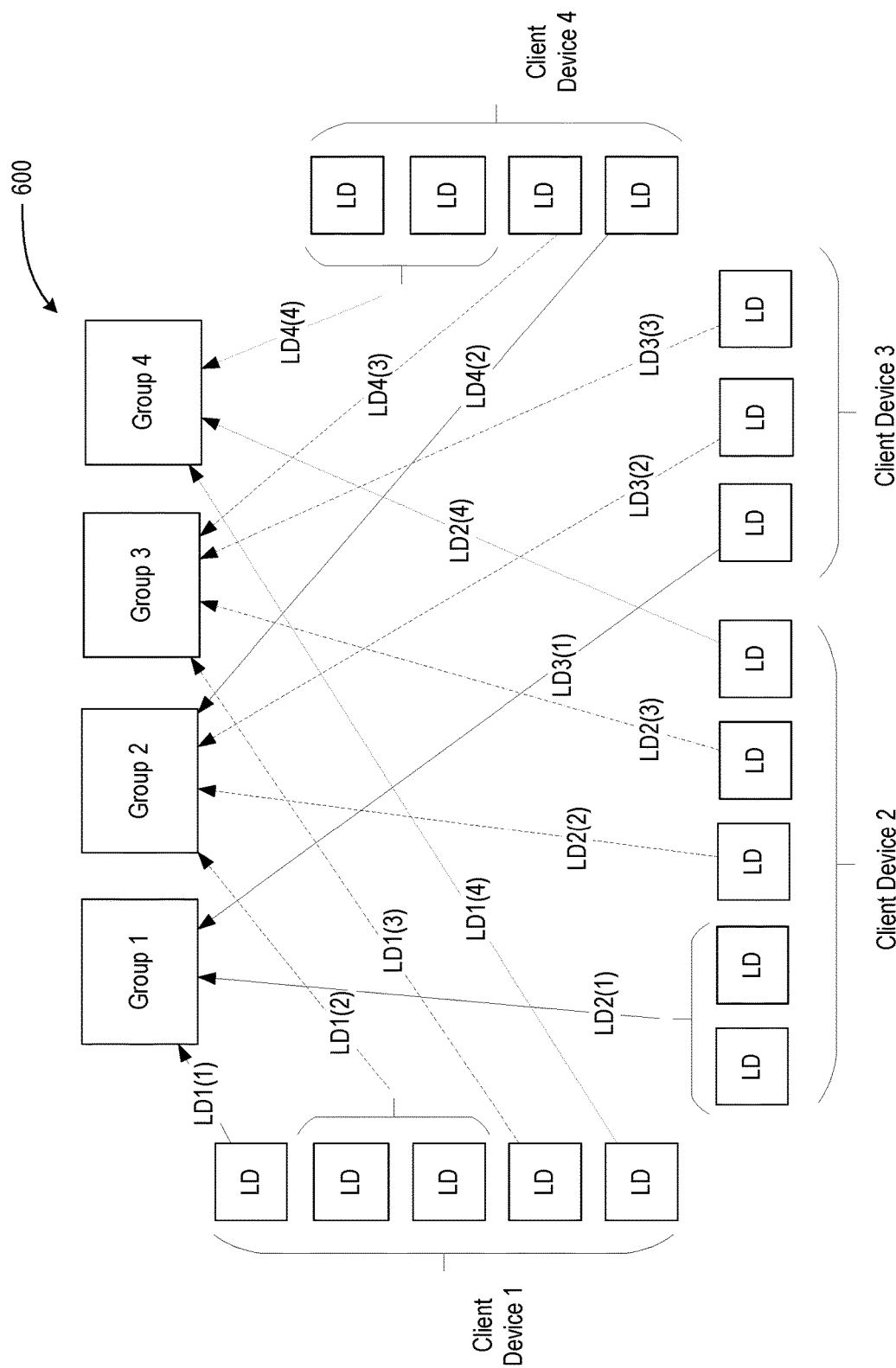
FIG. 6 illustrates an example grouping of configuration requests, in the order of their priority, during balancing of multiple configuration requests to redirect local devices in one exemplary implementations.

At block 540, the method 500 may identify a first group of the configuration requests comprising requests from at least two client devices. FIG. 6 illustrates how group 1 of configuration requests may be formed, in one exemplary implementations. Client device 1 (e.g., client device 201 (A)), given at block 530 the top priority, may have five local devices (LD) associated with it, client device 2 (having the next highest priority) may also have five of local devices, whereas client devices 3 and 4 may have three and four local devices, respectively. The method 500 may select some of the local devices into the first group (group 1) of configuration requests, whose execution may be prioritized relative to other requests. For example, one local device associated with each client device may be included in group 1, in some implementations. In another implementation, one local device per each client device of the first N client devices may be included in group 1. In some implementations, more than one local device per client device may be included into group 1. For example, as shown in FIG. 6, one local device associated with client devices 1, 3, and 4 may be included into group 1 whereas two local devices associated with client device 2 may be so included.

At block 550, the method 500 may identify a second group of the configuration requests. The requests selected into the second group (group 2) may have a lower priority of execution compared with the requests selected into the first group (group 1). The second group may have requests from only one client device, in some implementations. For example, of N configuration requests to redirect (e.g., to install, update, or remove) N local devices associated with client device 1 and M requests to redirect M local devices associated with client device 2, P requests from client device 1 may be placed into group 1, and N-P requests may be placed into group 2, while all M requests from client device 2 may be placed in group 1. FIG. 6 illustrates another example of how group 2 of configuration requests may be formed, in one exemplary implementations. Client device 1, given at block 530 the top priority, may have two requests included into group 2 whereas client devices 2, 3, and 4 may each have one request included into group 2. In general, any number of requests (not included in group 1) from any of the local devices may be included into group 2.

Selection of local devices into groups may, in some implementations, take into account not only the relative priorities of the client devices 206 (where, for example, a client device used by a health care provider may have a higher priority than a client device used by an auto dealership), but may also be based on priorities of different types of local devices that the host server may establish. For example, the host server may establish that configuration requests to install a driver may have a higher priority than configuration requests to uninstall a driver. As another example, printers may be ranked as having higher priority than scanners, or vice versa. Accordingly, as shown in FIG. 6, client device 1 (despite having a higher overall priority) may have requested only one high priority type local device to be redirected while client device 2 may have requested that two high priority type local devices be redirected. The remaining configuration requests—not included in groups 1 or 2—may similarly be assigned to groups with decreasing priority, such as groups 3, 4, and so on.

Henceforth, the notation LDj(k) shall denote a set of local devices 206 associated with the client device j and selected into group k. In some implementations, any set LDj(k) may include at most one local device (or may be empty). In other implementations, a set LDj(k) may include multiple local devices. For example, with reference to an implementation shown in FIG. 6, the set LD1(1) includes one local device associated with the client device 1 and selected into group 1, the set LD2(1) includes two local device associated with the client device 2 and selected into group 1, and the set LD4(4) includes two local device associated with the client device 4 and selected into group 4.

At block 560, the method 500 may begin execution of configuration requests by performing a plurality of traversal iterations over the client device list (which may be ordered according to the priority rankings of the client devices). The first traversal iteration may include execution of configuration requests in group 1: LD1(1), LD2(1), etc. The second traversal iteration may include execution of configuration requests in group 2: LD1(2), LD2(2), . . . and so on. Accordingly, at block 560, the method 500 may continue with executing in the order of decreased priority of client devices (i.e., starting with the highest priority client device), the first group (group 1) of configuration requests. For example, the first configuration request to be executed may be the first configuration request—such as to install, remove, or update the driver—of the set LD1(1), which in the example illustrated in FIG. 6 consists of a single local device. Next, the processing device executing method 500 may—in the order of decreased priority of the client devices—execute a pair of configuration requests comprising the set LD2(1). This may be followed by execution of the configuration request LD3(1) associated with client device 3. Such execution of the configuration requests of group 1 may continue until an occurrence of a restart condition.

To keep track of execution of various configuration requests within each traversal iteration (i.e., execution of various groups), the processing device may use a client device pointer, which may be a number stored by DBM 234. The client device pointer may point to a specific client device whose request are currently to be executed. For example, during execution of the k-th traversal iteration, the client device pointer j shows that the request in the set LDj(k) are to be executed. The value of the client device pointer changes from 1 to the maximum number owned by the last client device in group k. The value of the client device pointer increases by one when execution shifts to the next (e.g. j+1) client device on the client device list.

At decision-making block 570, the processing device executing method 500 may verify if the restart condition has occurred. For example, in some implementations, the method may check if execution of the requests LD2(1), LD3(1), etc., takes excessive time and unduly delays processing of the requests of the highest priority client device (e.g., client device 1) that are yet to be executed. For example, at block 570, it may be checked if the total time $T_{tot}$ of execution of the requests of group 1 exceeds some reference time $T_{ref}$. In some implementations, the reference time $T_{ref}$ may be related to the time $T_0$ it would have taken to process all requests from client device 1 if no requests from any other client devices had been processed. Since not all requests from client device 1 have been executed so far, the time $T_0$ may not be known precisely but it may be estimated. For example, the time $T_0$ may be estimated by multiplying the time it took to execute the very first request from client device 1 (e.g., the very first request of the set LD1(1)) by the total number of requests of client device 1 (e.g., five, in the implementation shown in FIG. 6).

In some implementations, the time to execute a single request from a client device may include some or all of the time it takes to receive the request from the client device, to parse the request, to determine if the client device has other requests outstanding, time to place the request into an appropriate group and/or set of requests, time to locate the driver for the local device, time to download the driver, time to install (or update the driver), time to troubleshoot the installed (updated) driver, and the like. The reference time $T_{ref}$ may then be determined according to some predetermined relationship to the time $T_0$. For example, the predetermined relationship may be that $T_{ref}=T_0$, or that $T_{ref}=1.5\, T_0$, or that $T_{ref}=2\, T_0$, or any other number (integer or fractional) of $T_0$.

If it is determined that $T_{tot} \leq T_{ref}$, meaning that unexecuted requests from client device 1 are not unduly delayed, it may be further verified whether all sets LDj(1) have been executed. If some of the sets LDj(1) are yet to be executed, the method 500 may continue with processing of unexecuted sets LDj(1) at block 550, as shown in FIG. 5. It may be determined, however, at block 570 that one of two situations has occurred. First, it may be determined that all sets LDj(1) have been executed. Second, it may be determined that $T_{tot} > T_{ref}$, meaning that unexecuted requests from client device 1 are unduly delayed.

In the first situation, with all sets LDj(1) already executed, the method 500 may continue with executing, at block 580, the second group (group 2) of configuration requests in order of decreased priority of client devices. The client device pointer may be reset, i.e. return to the value j=1, at the beginning of a new group (e.g., group 2) execution. More specifically, group 2 requests—aggregated into sets LD2(1), LD2(2), LD3(2), etc.—may be executed starting with the requests from the highest priority client device having at least one request in group 2. For example, if the set LD1(2) has at least one request, the execution of requests at block 580 may start with the execution of the LD1(2) requests. But if the set LD1(2) is empty (i.e., has no requests), the execution may begin with the LD2(2) requests, or with the LD3(2) requests. FIG. 7A illustrates schematically the order of execution of the requests in the first situation, where execution of the requests from the top priority client device is not unduly delayed, so that execution of the requests group 1 (in the order of decreased priority of the client devices) is followed by execution of the requests from group 2. Also shown is exemplary implementation of the subsequent groups (e.g., group 3) when execution of groups 1 and 2 is completed. Additional groups are not shown for conciseness, but may be executed in a similar order. For example, in one implementation, the set LDj+1(k) is executed after the set LDj(k) has been executed, with the exception of a situation where LDj(k) is the last set in group k. In this case, the execution of the next group k+1 is initiated, beginning with the set LD1(k+1). Whenever a particular set LDj(k) is empty, execution may continue with the next set, which may be LDj+1(k) or LD1(k+1), as explained above, until all sets are executed.

In the second situation, $T_{tot} > T_{ref}$, when the total time of execution of group 1 exceeds the reference time, the method 500 may temporarily terminate execution of group 1 requests and begin execution of the set LD1(2) so that client device 1 does not have to wait any longer. Here, as in the first situation described above, the client device pointer may be return to the value j=1. The client device pointer may be reset, i.e. return to the value j=1, at the beginning of a new group. After the execution of the set LD1(2) is complete, the method may continue with the execution of the sets LD2(2), LD3(2), and so on. If the execution of group 1 was stopped after execution of the set LDj*(1) (or after execution of some but not all the requests from the set LDj*(1)), the method may execute all LDj(2) with j<j*, and then revert back to execution of group 1 requests starting with the set LDj*(1) (or with the remaining unexecuted requests of the set LDj*(1), if its execution has been interrupted). FIG. 7B illustrates schematically the order of execution of the requests in the second situation, where execution of the requests from the lower-priority devices in group 1 is postponed in favor of execution of the requests from the higher-priority devices in group 2. FIG. 7B also illustrates one possible handling of requests from the subsequent groups, such as group 3 (with similar handing of groups 4, 5, and so on, implied but not shown explicitly). In particular, in the "staggered" implementation shown in FIG. 7B, execution of the sets LDj(k) with j≥j* (where j*=2 for the specific example shown) occurs after the set LDj*(k+1) has been executed. After all remaining sets in group k are executed, the processing device may begin execution of the first j* sets LDj(k+2) of group k+2 (unless group k+1 is the last group, in which case processing concludes with the execution of the remaining sets of group k+1. For example, as illustrated in FIG. 7B, after the sets LD3(2), LD 4(2), etc. of group 2 have been executed, the remaining sets LD3(3), LD4(3) of the last group (group 3, in this example) may then be executed.

FIG. 7C illustrates another possible example of a "catch up" execution of sets skipped upon the occurrence of the restart condition, $T_{tot} > T_{ref}$. More specifically, when the restart condition is detected to have occurred after execution of the LDj*(k) set, the processing device first executes the sets LDj(k+1) with j<j*, then resumes execution of the unexecuted sets LDj(k) with j≥j* of the previous group k, and then catches up by finishing execution of the remaining sets LDj(k+1) with j≥j* of group k+1. After completing both groups k and k+1 in this manner, the processing device may begin execution of the next group k+2 as if the restart condition did not happen (e.g., like in FIG. 7a).

FIG. 7D illustrates another possible implementation of processing of the configuration requests when multiple restart conditions occur during execution of the requests. For example, as shown in FIG. 7D, if the execution of the LD2(1) set of requests takes too long, execution of the remainder of group 1 requests may be temporarily suspended, and the execution may be reverted to group 2, like in the implementation shown in FIG. 7C. If, however, a second restart condition occurs later, e.g., after (or during) execution of the LD3(2) set, then the processing device may begin execution of the next group of requests, e.g., group 3, with the remaining requests to be treated using the "staggered" execution (as in FIG. 7B) or the "catch up" execution (as in FIG. 7C). The second restart condition may be determined similarly to the first restart condition. For example, to evaluate if the second restart condition has occurred, the processing device may compare the time that has passed since the last restart condition to some second reference time, e.g., the time it would have taken to execute all remaining requests of the highest priority client device with at least one unexecuted request still remaining, in one implementation. In another implementation, the time to be compared to the second reference time is the time that has elapsed since the completion of the last set of requests of the highest priority client device with at least one unexecuted request remaining (e.g., the time that has elapsed since all LD1(2) requests had been completed, with reference to FIG. 7D).

In some implementations, the restart condition may also be determined with reference to the second highest priority client device (or the third highest priority device, and so on). For example, it may happen that client device 1 has many local devices associated with is whereas client device 2 may have only a few. Accordingly, during execution of the requests from client devices 3, 4, 5, and so on, the restart condition with respect to client device 1 does not occur. It may happen, however, that the restart condition for client device 2 does occur. For example, the reference time with respect to the second local device may be computed as the number of the requests fielded by client device 2 times the time it took to execute the first request of client device 2. Accordingly, due to a low number of requests fielded by client device 2, the restart condition with respect to client device 2 may occur before the restart condition with respect to client device 1 occurs (if at all). The same methods and processes as described above may also be used in such situations. For example, where in FIGS. 7b-d the execution of sets LD1(k) is performed following the occurrence of the (first or second) restart condition with respect to client device 1, the execution of sets LD2(k) may now be performed following the occurrence of the (first or second or subsequent) restart condition with respect to client device 2. In some implementations, after a restart, execution of the next group of requests may begin with the requests of the local device with respect to which the restart condition occurs. More specifically, if the restart condition occurred with respect to the j-th local device, the execution of the next group of requests may begin with the requests of the j-th device. In other implementation, regardless of which local device happened to be the cause of the restart, the execution of the next group of requests may nonetheless begin with the requests of the highest priority client device having at least one unexecuted request in that group of requests.

The method 500 and implementations described above are scalable and can be implemented for balancing of any number of client devices fielding any number of requests to redirect local devices associated with these client devices. In some implementations, there may be multiple threads implementing method 500 independently of each other. For example, in some implementations, each thread may execute requests from different pluralities of the client devices. In some implementations, all configuration requests from the same client device may be handled by the same thread. Distribution of client devices among multiple threads may be performed on the basis of balancing the number of client devices and/or the number of local devices associated with each client device. For example, different threads may be balanced to have equal number of client devices, or approximately equal number of client devices, so that the difference in the number of client devices between different threads does not exceed a pre-determined number (e.g., one, two, three, etc.) of the client devices in a single thread or does not exceed a pre-determined percentile (e.g., 10%, 20%, 30%, etc.) of the client devices in a single thread. In other implementations, different threads may be balanced to have equal total number of configuration requests from all client devices in a thread, or approximately equal number of such requests, so that the difference in the number of requests between different threads does not exceed a pre-determined number or a pre-determined percentile of the requests in a single thread.

If a client device is adding another request to its prior requests, the processing device may first determine the client device ID and look up the client device ID among the open threads implementing method 500. If the client device ID is found among the open threads and the thread is identified as handling current requests from the client device, the processing device may add the new request(s) from the client device to this thread. This may be performed even though addition of the new requests may place the thread out of balance regarding equal distribution of requests among the threads. When additional requests from a client device that is already present in the thread are submitted, such requests may be placed in the lowest priority group, i.e. into the last set LDj(k) for that client device, in some implementations. In other implementations, if the request is to add a driver for a high priority local device (e.g., a device for a fire alarm or a video surveillance device), such request(s) may be placed into a higher priority set LDj(k) for that client device, up to the first unexecuted (or incompletely executed) set of requests.

If a new client device submits its configuration requests (or if the existing client device whose prior requests have already been executed submits new requests), the processing device may place this client device into a thread that has the lowest number of client devices with at least one unexecuted request or place it into a thread that has the lowest total number of unexecuted requests. In some implementations, the new client device may be added as the lowest priority client device. In other implementations, the new client may be added anywhere into the existing order of client devices, including between the first highest priority device and the second highest priority device, depending on the type of the client device. In some implementations, the new device may even become the highest priority client device (if, for example, the new device is a client device associated with a heath care provider or is a government client). When all requests from all client devices in a given thread are execution, the thread may go into an idle state.

Figure 8:
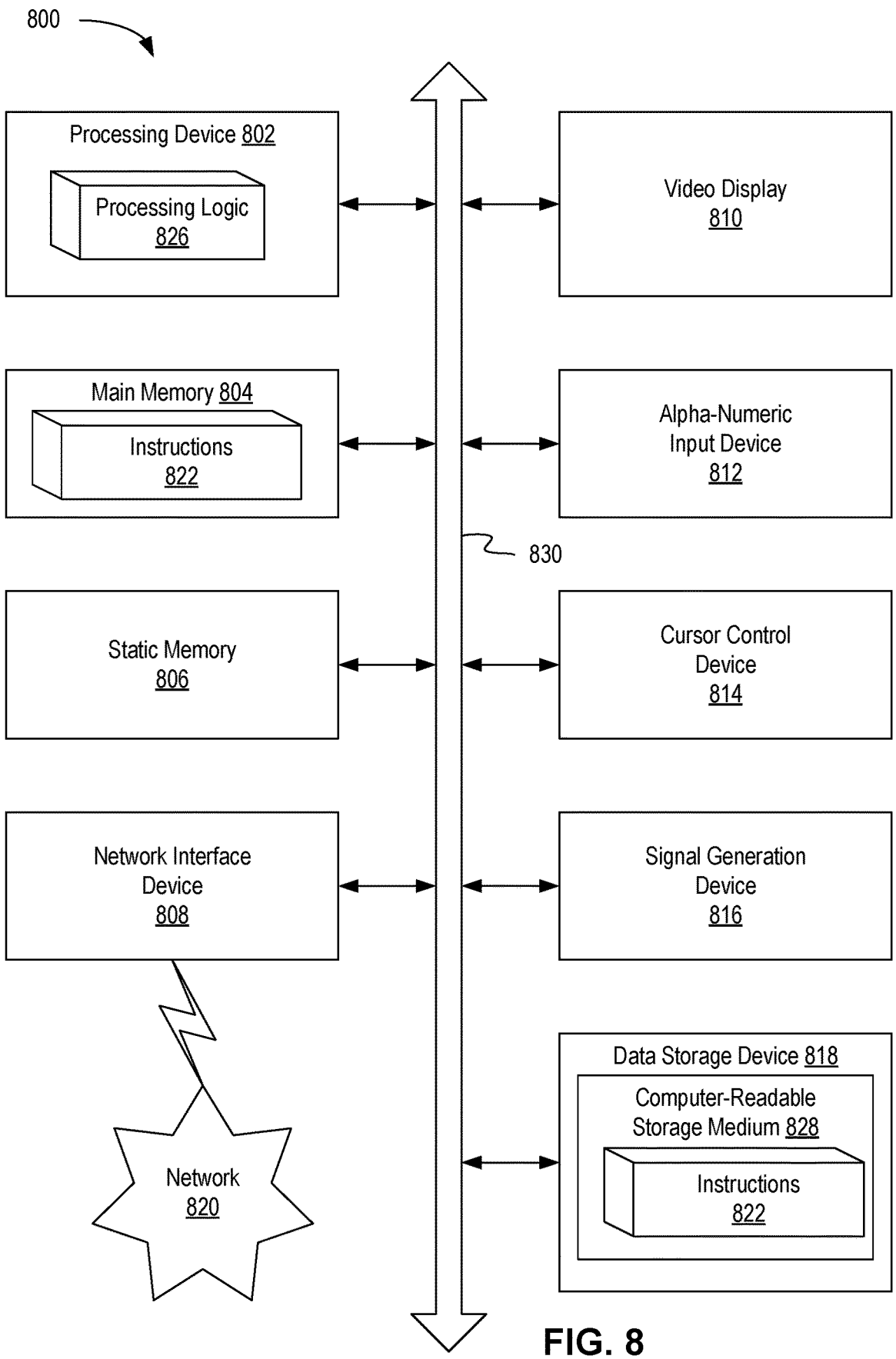
FIG. 8 depicts a block diagram of an example computer system capable of redirecting and balancing configuration requests from multiple client devices, operating in accordance with one or more aspects of the present disclosure.

FIG. 8 depicts a block diagram of an example computer system 800 capable of redirecting and balancing configuration requests from multiple client devices, operating in accordance with one or more aspects of the present disclosure. In various illustrative examples, computer system 800 may represent the gateway server 120, the terminal server 130, additional terminal servers, and/or client device 101, as illustrated in FIGS. 1 and 2.

Example computer system 800 may be connected to other computer systems in a LAN, an intranet, an extranet, and/or the Internet. Computer system 800 may operate in the capacity of a server in a client-server network environment. Computer system 800 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example computer system 800 may include a processing device 402 (also referred to as a processor or CPU), a main memory 804 (e.g., read-only memory (ROM), flash memory, dynamic random access memory (DRAM) such as synchronous DRAM (SDRAM), etc.), a static memory 806 (e.g., flash memory, static random access memory (SRAM), etc.), and a secondary memory (e.g., a data storage device 818), which may communicate with each other via a bus 730.

Processing device 802 represents one or more general-purpose processing devices such as a microprocessor, central processing unit, or the like. More particularly, processing device 802 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 802 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 802 may be configured to execute instructions implementing methods 300 and 400 of redirecting configuration requests and/or method 500 of balancing configuration requests from multiple client devices.

Example computer system 800 may further comprise a network interface device 808, which may be communicatively coupled to a network 820. Example computer system 800 may further comprise a video display 810 (e.g., a liquid crystal display (LCD), a touch screen, or a cathode ray tube (CRT)), an alphanumeric input device 812 (e.g., a keyboard), a cursor control device 814 (e.g., a mouse), and an acoustic signal generation device 816 (e.g., a speaker).

Data storage device 818 may include a computer-readable storage medium (or, more specifically, a non-transitory computer-readable storage medium) 828 on which is stored one or more sets of executable instructions 822. In accordance with one or more aspects of the present disclosure, executable instructions 822 may comprise executable instructions implementing methods 300 and 400 of redirecting configuration requests and/or method 500 of balancing configuration requests from multiple client devices.

Executable instructions 822 may also reside, completely or at least partially, within main memory 804 and/or within processing device 802 during execution thereof by example computer system 800, main memory 804 and processing device 802 also constituting computer-readable storage media. Executable instructions 822 may further be transmitted or received over a network via network interface device 808.

While the computer-readable storage medium 828 is shown in FIG. 8 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMS), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method comprising:
   establishing, by a processing device, connections between a host server and a plurality of client devices, wherein the host server is to provide one or more applications to each of the client devices via a connection between the host server and the corresponding client device, and wherein each of the client devices is associated with one or more local devices;
   receiving, by the processing device, from each of the plurality of client devices, one or more configuration requests to configure, on the host server, one or more drivers for the one or more local devices associated with a corresponding client device, wherein the one or more drivers for the one or more local devices are to convert data between a data format accessible to the one or more local devices and a data format accessible to the one or more applications provided to the corresponding client device;
   identifying execution priority of the plurality of client devices with respect to configuration requests to configure respective drivers;

identifying a first group of configuration requests comprising configuration requests from at least two client devices of the plurality of client devices;

identifying a second group of configuration requests comprising at least one configuration request from at least one client device of the plurality of client devices;

executing, in order of decreased priority of client devices, the first group of configuration requests until an occurrence of a restart condition; and responsive to the occurrence of the restart condition, executing, in order of decreased priority of client devices, the second group of configuration requests; wherein receiving, by the processing device, from a client device of the plurality of client devices a configuration request of the one or more configuration requests to configure a driver of the one or more drivers for a local device of the one or more local devices comprises installing the driver of the one or more drivers for the local device of the one or more local devices; and upon termination of the connection between the host server and the client device of the plurality of client devices the processing device executes a first process comprising the steps of:

analysing historical data relating to connections between the host server and the client device of the plurality of client devices to establish a first probability, the first probability being a probability of the client device of the plurality of client devices reconnecting to the host server within a first predetermined period of time;

determining whether the first probability is below a first threshold value;

upon determining that the first probability is below the first threshold value uninstalling the driver of the one or more drivers for the local device of the one or more local devices; and upon determining that the first probability is above the first threshold value keeping the driver of the one or more drivers for the local device of the one or more local devices installed.

2. The method of claim 1, wherein
the restart condition occurs when a current execution time of the first group of the configuration requests exceeds a reference time, and
the reference time was computed based on a time of execution of a reference configuration request selected from the first group of the configuration requests.

3. The method of claim 1, wherein
executing the first group of the configuration requests comprises executing one set of the configuration requests per client device in order of the identified execution priority for the plurality of client devices.

4. The method of claim 1, wherein upon determining that the first probability is above the first threshold value the processing device executes a second process comprising the steps of: analysing the historical data relating to connections between the host server and the client device of the plurality of client devices to establish a second probability, the second probability being a probability of the client device of the plurality of client devices reconnecting to the host server within a second predetermined period of time; determining whether the second probability is above a second threshold value; and upon determining that the second probability is above the second threshold value reinstalling the driver of the one or more drivers for the local device of the one or more local devices installed.

5. The method of claim 1, wherein upon determining that the first probability is above the first threshold value the processing device executes a second process comprising the steps of: analysing the historical data relating to connections between the host server and the client device of the plurality of client devices to establish a second probability, the second probability being a probability of the client device of the plurality of client devices reconnecting to the host server within a second predetermined period of time; determining whether the second probability is above a second threshold value; and upon determining that the second probability is above the second threshold value reinstalling the driver of the one or more drivers for the local device of the one or more local devices installed prior to the second predetermined period of time ending.

6. The method according to claim 1, wherein
wherein receiving, by the processing device, from a client device of the plurality of client devices a configuration request of the one or more configuration requests to configure a driver of the one or more drivers for a local device of the one or more local devices comprises installing the driver of the one or more drivers for the local device of the one or more local devices;

termination of the connection between the host server and the client device of the plurality of client devices the processing device results in the driver of the one or more drivers for the local device of the one or more local devices being uninstalled; and the processing device executes a first process comprising the steps of:

analysing the historical data relating to connections between the host server and the client device of the plurality of client devices to establish a first probability, the first probability being a probability of the client device of the plurality of client devices reconnecting to the host server within a first predetermined period of time;

determining whether the first probability is above a second threshold value; and upon determining that the first probability is above the first threshold value reinstalling the driver of the one or more drivers for the local device of the one or more local devices installed prior to the first predetermined period of time ending.

7. The method according to claim 1, wherein
the processing device executes a first process comprising the steps of:

analysing historical data relating to connections between the host server and the plurality of client devices to establish a time of an expected increase in demand for the one or more drivers for the one or more local devices; and installing the one of more drivers for the one or more local devices prior to the time of the expected increase of demand.

8. The method according to claim 1, wherein
the host server is a gateway server or a terminal server.

9. The method according to claim 1, wherein
the host server is one of a plurality of host servers coupled to a gateway server disposed between the host server and the plurality of client devices;

another processing device associated with the gateway server upon receipt of a processing request from a client device of the plurality of client devices executes a process comprising:

determining whether any host server of the plurality of host servers has an ongoing session the client device of the plurality of client devices;

upon a positive determination the gateway server instructs the host server of the plurality of host servers to provide the ongoing session to the client device of the plurality of client devices;

upon a negative determination the gateway server instructs a selected host server of the plurality of host servers to provide a new session to the client device of the plurality of client devices.

10. The method according to claim 9, wherein
the selected host server of the plurality of host servers is established in dependence upon current loads of the plurality of host servers.

11. The method according to claim 1, wherein
each configuration request within the first group of configuration requests relates to installing a driver of the one or more drivers for the one or more local devices; and
each configuration request within the second group of configurations requests relates to uninstalling a driver of the one or more drivers for the one or more local devices.

12. The method according to claim 1, wherein
each configuration request within the first group of configuration requests relates to a configuration request for a first type of local device of the one or more local devices; and
each configuration request within the second group of configuration requests relates to a configuration request for a second type of local device of the one or more local devices.

13. The method according to claim 1, wherein
each configuration request relates to installing, removing or updating a driver of the one or more drivers for a client device of the one or more client devices.

14. The method of claim 1, wherein
the restart condition occurs when a current execution time of the first group of the configuration requests exceeds a reference time, and
the reference time was computed based on a time of execution calculated for processing all configuration requests from a client device of the one or more client devices.

15. The method of claim 1, wherein
the restart condition occurs when a current execution time of the first group of the configuration requests exceeds a reference time;
the reference time was computed based on multiplying a time of execution calculated for processing all configuration requests from a client device of the one or more client devices by a predetermined multiplier; and
the predetermined multiplier is greater than or equal to one.

16. The method according to claim 1, further comprising
identifying one or more additional groups of configuration requests comprising at least one configuration request from at least one client device of the plurality of client devices;
executing, in order of decreased priority of client devices, each additional group of configuration requests of the one or more additional groups of configuration requests in sequence unless an occurrence of a restart condition occurs; wherein
responsive to the occurrence of the restart condition, executing, in order of decreased priority of client devices, a subsequent additional group of configuration requests of the one or more additional groups of configuration requests; and
the restart condition relates to an execution time of a current group of configuration requests of a current additional group of configuration requests of the one or more additional groups of configuration requests.

17. The method according to claim 1, wherein
the processing device executes multiple threads; and
all configuration requests from a specific client device of the one or more client devices are handled by a single thread of the multiple threads.

18. The method according to claim 1, wherein
the processing device executes multiple threads;
the one or more client devices are distributed across the multiple threads; and
distribution of the one or more client devices across the multiple threads is based upon balancing the number of client devices of the one or more client devices executed by each thread of the multiple devices.

19. The method according to claim 1, wherein
the processing device executes multiple threads;
the one or more local devices are distributed across the multiple threads; and
distribution of the one or more local devices across the multiple threads is based upon balancing the number of local devices of the one or more local devices executed by each thread of the multiple devices.

20. A method comprising:
establishing, by a processing device, connections between a host server and a plurality of client devices, wherein the host server is to provide one or more applications to each of the client devices via a connection between the host server and the corresponding client device, and wherein each of the client devices is associated with one or more local devices;
receiving, by the processing device, from each of the plurality of client devices, one or more configuration requests to configure, on the host server, one or more drivers for the one or more local devices associated with a corresponding client device, wherein the one or more drivers for the one or more local devices are to convert data between a data format accessible to the one or more local devices and a data format accessible to the one or more applications provided to the corresponding client device; wherein
receiving, by the processing device, from a client device of the plurality of client devices a configuration request of the one or more configuration requests to configure a driver of the one or more drivers for a local device of the one or more local devices comprises installing the driver of the one or more drivers for the local device of the one or more local devices; and
upon termination of the connection between the host server and the client device of the plurality of client devices the processing device executes a first process comprising the steps of:
analysing historical data relating to connections between the host server and the client device of the plurality of client devices to establish a first probability, the first probability being a probability of the client device of the plurality of client devices reconnecting to the host server within a first predetermined period of time;
determining whether the first probability is below a first threshold value;

upon determining that the first probability is below the first threshold value uninstalling the driver of the one or more drivers for the local device of the one or more local devices; and upon determining that the first probability is above the first threshold value keeping the driver of the one or more drivers for the local device of the one or more local devices installed.

* * * * *